(12) United States Patent
Stracke

(10) Patent No.: US 11,566,605 B2
(45) Date of Patent: Jan. 31, 2023

(54) METHOD FOR MANUFACTURING SEGMENTS FOR A TOWER, PRESTRESSED SEGMENT, TOWER RING, TOWER, WIND TURBINE, AND PRESTRESSING DEVICE

(71) Applicant: Wobben Properties GmbH, Aurich (DE)

(72) Inventor: Olaf Stracke, Emden (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/112,710

(22) Filed: Dec. 4, 2020

(65) Prior Publication Data
US 2021/0172426 A1    Jun. 10, 2021

(30) Foreign Application Priority Data

Dec. 10, 2019  (DE) .......................... 102019133730.5

(51) Int. Cl.
*F03D 13/20*     (2016.01)
*B28B 23/04*     (2006.01)
(Continued)

(52) U.S. Cl.
CPC .......... *F03D 13/20* (2016.05); *B28B 23/0006* (2013.01); *B28B 23/02* (2013.01);
(Continued)

(58) Field of Classification Search
CPC ..... B28B 23/06; B28B 23/0006; B28B 23/02; B28B 23/04; B28B 23/043; B28B 21/60; E04C 5/127
See application file for complete search history.

(56) References Cited

U.S. PATENT DOCUMENTS 7,802,412 B2   9/2010  Jensen
9,062,662 B1   6/2015  Johnson et al.
(Continued)

FOREIGN PATENT DOCUMENTS

CN    101851985 A    10/2010
CN    102312799 A    1/2012
(Continued)

OTHER PUBLICATIONS

Luc Taerwe, "Use of Fibre Reinforced Polymers (FRP) in concrete structures: A critical appraisal", *Massivbau in ganzer Breite*, 2005, pp. 161-174.

*Primary Examiner* — Kelly M Gambetta
*Assistant Examiner* — Virak Nguon
(74) *Attorney, Agent, or Firm* — Seed Intellectual Property Law Group LLP

(57) ABSTRACT

Provided is a method for manufacturing segments for a tower, in particular of a wind turbine, and a prestressed segment for a tower. Provided is tower ring for a tower, a tower of the wind turbine, and a wind turbine. In addition, a prestressing device is provided. The method for manufacturing segments for a tower, in particular of a wind turbine, comprises: arranging at least one prestressing element in a mold, wherein the prestressing element comprises or consists of fiber-reinforced plastic; tensioning the prestressing element; embedding the prestressing element in a concrete mass; hardening of the concrete mass into a longitudinal segment, preferably in the form of a complete longitudinal segment of a tower; removing the hardened longitudinal segment from the mold.

14 Claims, 10 Drawing Sheets

(51) Int. Cl.
  E04C 5/07 (2006.01)
  E04H 12/12 (2006.01)
  B28B 23/00 (2006.01)
  B28B 23/02 (2006.01)

(52) U.S. Cl.
  CPC ............ B28B 23/04 (2013.01); B28B 23/043 (2013.01); E04C 5/073 (2013.01); E04H 12/12 (2013.01); *F05B 2230/21* (2013.01)

(56) References Cited

U.S. PATENT DOCUMENTS

| | | | |
|---|---|---|---|
| 9,657,722 B2 | 5/2017 | Wagner | |
| 9,938,721 B2 | 4/2018 | Kurath-Grollmann | |
| 2010/0132282 A1* | 6/2010 | Voss | E04C 5/085 52/223.5 |
| 2016/0053492 A1* | 2/2016 | Leinenbach | E04G 21/12 52/223.14 |
| 2019/0003199 A1* | 1/2019 | Porm | E04H 12/085 |
| 2019/0152849 A1* | 5/2019 | Scurgai | C04B 20/1077 |

FOREIGN PATENT DOCUMENTS

| | | | | |
|---|---|---|---|---|
| CN | 107002424 A | 8/2017 | | |
| CN | 108138510 A | 6/2018 | | |
| CN | 109642549 A | 4/2019 | | |
| DE | 19719049 C1 | 6/1998 | | |
| DE | 102004033015 A1 | 3/2005 | | |
| DE | 60317372 T2 | 8/2008 | | |
| DE | 102011107804 A1 | 1/2013 | | |
| DE | 102012210877 A1 | 3/2014 | | |
| DE | 102013108692 A1 | 2/2015 | | |
| EP | 2305923 A2 | 4/2011 | | |
| EP | 2253782 B1 | 8/2013 | | |
| JP | 5048516 B2 * | 10/2012 | ............ | B29C 70/16 |
| WO | 2007074840 A1 | 7/2007 | | |
| WO | 2011/063983 A1 | 6/2011 | | |
| WO | 2012/168467 A2 | 12/2012 | | |
| WO | 2014/037421 A1 | 3/2014 | | |
| WO | 2014040653 A1 | 3/2014 | | |

* cited by examiner

METHOD FOR MANUFACTURING SEGMENTS FOR A TOWER, PRESTRESSED SEGMENT, TOWER RING, TOWER, WIND TURBINE, AND PRESTRESSING DEVICE

BACKGROUND

Technical Field

The invention concerns a method for producing segments for a tower, in particular of a wind turbine, and a segment for a tower. The invention furthermore concerns a tower ring for a tower, a tower of a wind turbine, and a wind turbine. The invention furthermore concerns a prestressing device.

Description of the Related Art

Towers, in particular towers of wind turbines, may reach heights of over 100 m (meters), for example 135 m, and be exposed to high mechanical loads during operation. Towers of wind turbines are frequently formed as steel towers, concrete towers comprising or consisting of reinforced concrete and/or prestressed concrete, or as hybrid towers comprising a concrete tower portion and a steel tower portion. A concrete tower in particular is a tower which consists for the largest part of concrete, wherein however portions may be made of another material, preferably steel, or several different materials. The solution described herein refers in particular to concrete towers and/or hybrid towers, in particular the concrete tower portion of a hybrid tower. Where the text below refers to concrete towers, this includes in particular concrete towers and/or hybrid towers, in particular concrete tower portions of hybrid towers.

To reinforce and prestress concrete towers, in particular prestressed concrete towers, such as for example concrete towers of wind turbines, often prestressing elements are used. For this, the prestressing elements are anchored accordingly to the tower, for example to the tower foot or foundation, and to the tower wall in order to prestress the tower over the height. The prestressing elements may run in the tower wall, which is also described as internal prestressing or internally arranged prestressing elements. For this, during concreting, usually empty sleeves are cast into the concrete, through which the prestressing elements are later drawn. Alternatively, the prestressing elements may also run outside the tower wall, for example on the inside of the tower, which is also described as external prestressing or externally arranged prestressing elements. The anchoring of the prestressing element, usually to the tower foot and/or tower head, may take place for example via a fixed anchor and/or via a tensioning anchor.

Concrete towers for wind turbines are known for example from WO 2011/063983 A1, WO 2012/168467 A2.

The manufacture of concrete towers is as a whole time-consuming and cost-intensive. For example, often reinforcing and prestressing takes considerable labor and time, and requires the use of costly special tools.

The German Patent and Trademark Office has searched the following prior art in the priority application for the present application: EP 2 305 923 A2, EP 2 253 782 B1, DE 10 2004 033 015 A1, DE 603 17 372 T2, DE 10 2011 107 804 A1, Use of Fibre Reinforced Polymers (FRP) in concrete structures, DE 10 2012 210 877 A1, DE 10 2013 108 692 A1, WO 2014/037 421 A1, CN 101851985 A.

BRIEF SUMMARY

Provided is a solution which reduces the requirement for labor, time and/or cost for manufacturing a concrete tower.

According to a first aspect, provided is a method for manufacturing segments for a tower, in particular of a wind turbine, comprising: arranging at least one prestressing element in a mold, wherein the prestressing element comprises or consists of fiber-reinforced plastic; tensioning the prestressing element; embedding the prestressing element in a concrete mass; hardening of the concrete mass into a longitudinal segment, preferably in the form of a complete longitudinal segment of a tower; removing the hardened longitudinal segment from the mold.

A concrete tower preferably has a tubular, conical or frustoconical geometry, wherein the tower diameter diminishes along its longitudinal extent towards the top in the vertical direction. The cross-section of a tower orthogonally to the longitudinal extent of the tower may in particular be round or polygonal, preferably octagonal, 12-sided or 24-sided. Where the text below refers to an annular design or annular geometry, preferably this includes both round and polygonal cross-sections of the tower or tower ring.

Such a tower usually comprises a number of tower rings which have an annular geometry with a defined height. The annular wall furthermore has a thickness. The tower rings are preferably arranged successively along the longitudinal extent of the tower such that the end faces abut each other substantially completely.

The tower rings often comprise several segments in order, inter alia, to facilitate transport, in particular delivery of the tower rings to the erection site of the wind turbine, by components of smaller size. In particular, this applies to the tower rings arranged in the lower region of the tower, since usually these have the largest diameter. A tower ring may for example be composed of two segments which for example each form a 180° arcuate segment of the tower ring. A tower ring may however also be composed of several segments which for example each form a platform-like or dish-like segment of a tower ring. For concrete towers and/or hybrid towers, in particular concrete tower portions for hybrid towers, the segments are preferably pre-produced industrially as precast concrete parts, and assembled and connected together in order to construct the tower at the erection site of the wind turbine.

A prestressing element preferably has a longitudinal direction, a transverse direction oriented orthogonally to the longitudinal direction, and a thickness direction oriented orthogonally to the longitudinal direction and orthogonally to the transverse direction. The extent of the prestressing element in the longitudinal direction is greater, in particular many times greater, than in the transverse direction. Also, preferably, the extent of the prestressing element in the transverse direction is greater than in the thickness direction. The extent of the prestressing element in the transverse direction and in the thickness direction may however be the same. In the method described, at least one prestressing element is arranged in a mold. Preferably several, for example four, prestressing elements are arranged in the mold, in particular oriented parallel to one another.

Such a prestressing element according to the solution described here comprises or consists of fiber-reinforced plastic. The prestressing element thus has a fiber part and a plastic part.

When the prestressing element is tensioned, preferably a tensile stress is applied to the prestressing element in the longitudinal direction of the prestressing element. Preferably, two ends of the prestressing element are moved apart in the longitudinal direction, whereby a stretch is applied to the prestressing element in the longitudinal direction and hence a tensile stress in the longitudinal direction.

The prestressing element is embedded in a concrete mass. Preferably, a non-hardened, pourable concrete mass is cast into the mold so that the tensioned prestressing element is preferably completely surrounded by the concrete mass. The concrete mass is then hardened. Thus, preferably, a force-fit connection is created between the prestressing element and the hardened concrete mass. The hardened concrete mass is also referred to below as the concrete part. Preferably, the segment is prestressed by the tensioning of the prestressing element, and preferably by the tensile stress applied to the prestressing element, since the tensioned prestressing element, in particular by the force-fit connection between the prestressing element and the hardened concrete mass, places the resulting segment, in particular its concrete part, under a compressive stress, preferably in the longitudinal direction of the prestressing element.

Thus the concrete mass is hardened into a longitudinal segment, preferably in the form of a complete longitudinal segment. Several segments arranged one above the other may be produced from the complete longitudinal segment by cutting through the complete longitudinal segment several times, wherein when the segments are installed in the concrete tower, they are arranged one above the other, preferably in a direction parallel to and/or along the longitudinal extent of the tower. A complete longitudinal segment may preferably extend along the entire concrete tower or the entire concrete tower portion. In a concrete tower, a complete longitudinal segment may thus extend from a foundation up to the end of the tower; in the case of a tower of a wind turbine, in particular up to the connecting portion to a nacelle. In a hybrid tower, a complete longitudinal segment may extend from a foundation up to the end of the concrete tower portion, in particular up to the transition to a steel tower portion. In the circumferential direction of the tower, preferably several segments or longitudinal segments are arranged next to one another and adjoining each other. The several segments, which may be produced from a complete longitudinal segment and/or a longitudinal segment by cutting, are preferably connected together, in particular in an intermediate manufacturing step, before the complete longitudinal segment and/or longitudinal segment is cut into two or more segments. At least one segment, preferably several segments, may be produced from one longitudinal segment. The segments produced from a longitudinal segment and/or from a complete segment, when installed in the concrete tower, are arranged one above the other, preferably in a direction parallel to and/or along the longitudinal extent of the tower. Preferably, two or more segments may be produced from a complete longitudinal segment. Preferably also, two or more longitudinal segments may be produced from a complete longitudinal segment. The longitudinal segments and/or complete longitudinal segments and/or segments may be configured as platforms and have a curvature or no curvature. The wall thickness of the complete longitudinal segments, longitudinal segments and segments may vary along the tower. The complete longitudinal segments and/or the longitudinal segments and/or the segments preferably each have a flat plane which may be curved or not curved, wherein the extent of the complete longitudinal segments, longitudinal segments and segments in the flat plane is many times greater than the extent of the complete longitudinal segments and/or longitudinal segments or segments in the thickness direction oriented orthogonally to the flat plane. Removing the hardened longitudinal segment and/or hardened complete longitudinal segment from the mold preferably comprises extracting the longitudinal segment and/or complete longitudinal segment from the mold.

The order of the steps described in this method is not fixed and they may in particular be performed in different sequences. It is preferred if the arrangement of at least one prestressing element in the mold and/or the tensioning of the prestressing element take place before the embedding of the prestressing element in a concrete mass. Preferably, the hardening of the concrete mass into a longitudinal segment takes place after the embedding of the prestressing element in a concrete mass. Preferably, the removal of the hardened longitudinal segment from the mold takes place after the hardening of the concrete mass into a longitudinal segment.

A first advantage of this method is that, due to the use of fiber-reinforced plastic for the embedded prestressing elements, in particular because of the high specific stiffness and high specific strength of this material, the weight of the individual segments may be reduced. It is furthermore advantageous that, due to an arrangement of fibers of the fiber part in the longitudinal direction, the tensile forces may be optimally absorbed by the fibers. In contrast to prestressing elements made of steel, on use of prestressing elements made of fiber-reinforced plastic, anisotropic material properties may be utilized, in particular by an arrangement of fibers in and/or parallel to the longitudinal direction. Thus a high stiffness in the longitudinal direction and a high strength in the longitudinal direction may be achieved with simultaneously relatively low weight.

A further advantage is that a prestressing element which comprises or consists of fiber-reinforced plastic may be chemically more resistant than a conventional prestressing element which consists for example of steel. The prestressing element need not therefore have a minimum distance from the edge of the segment in order to avoid corrosion.

A further advantage is that a force-fit connection is possible between the prestressing element and the hardened concrete mass. Thus force can be transmitted between the prestressing element and the hardened concrete mass along the entire longitudinal extent of the prestressing element. In this way, anchoring of the tensioned prestressing elements at their ends in a space-intensive and tool-intensive fashion—as required in particular for internally arranged (in envelope tubes) or externally arranged prestressing elements—may be omitted. The tensioning of the prestressing element, in particular by tensile stress, may thus advantageously create an even prestress in the concrete part over its length.

The use of fiber-reinforced plastic for a prestressing element or several prestressing elements allows the production of segments which are more slender and/or lighter. Thus the material usage and the weight of the segments may be reduced. This may be advantageous both for transport of the segments and for the material costs. The segments produced according to the described method may preferably be transported on the loading surface of a transport vehicle without the load being oversized or requiring large-volume transport. It is advantageous that no exemption permit is required for transport of an oversized load. Thus the transport of the segments may be substantially simplified.

A further advantage of such a method is that the segments produced with such a method are already prestressed and hence complex prestressing of the segments during erection of a tower is no longer required.

A further advantage of such a method is that by integrating the prestressing elements in the concrete part, substantially less space is required in comparison with externally arranged prestressing elements. Furthermore, the embedded prestressing elements with or made of fiber-reinforced plastic, in comparison with conventional prestressing elements made of steel, may reduce the weight and in some cases also the thickness of the segments, whereby material and transport costs can be reduced.

The prestressing elements preferably have a fiber volume content of at least 40% by volume, particularly preferably at least 50% by volume, and in particular at least 55% by volume. The fibers of the fiber part are preferably present in the form of rovings or fiber bundles. Preferably at least 80%, particularly preferably at least 90%, in particular at least 99% of the fibers are arranged in the longitudinal direction of the prestressing element. Furthermore, preferably at least 80%, particularly preferably at least 90%, in particular at least 99% of the rovings or fiber bundles are arranged in the longitudinal direction of the prestressing element. The rovings or fiber bundles are preferably held together in the form of nonwoven and/or woven fiber fabrics. In particular, it is preferred if all fibers are arranged in the longitudinal direction of the prestressing element. The plastic part preferably comprises or consists of a duroplastic, in particular in the form of an epoxy resin or unsaturated polyester.

The solution described here is not restricted to the use of towers, in particular towers of wind turbines, although it is particularly advantageous and can be used particularly economically there. Rather, a method described here for the manufacture of segments may also be used in structures of different types, in particular high structures.

In a particularly preferred embodiment, the method comprises releasing a connection between the prestressing element and a prestressing device. The prestressing device is preferably configured to hold and tension the prestressing element. The prestressing device preferably applies a tensile stress to the prestressing element. The prestressing device is here connected, preferably releasably, to the prestressing element. The connection between the prestressing element and the prestressing device is preferably released after hardening of the concrete mass into a longitudinal segment. In this way, the tensioning force can be transmitted to the hardened concrete mass. The connection between the prestressing element and the prestressing device is also preferably released before the hardened longitudinal segment is removed from the mold.

In a particularly preferred embodiment, the method comprises cutting the longitudinal segment into several segments. The longitudinal segment is preferably divided into several segments. Preferably, the longitudinal segments are cut orthogonally to the longitudinal direction of the prestressing element. Preferably, the prestressing element is also cut through. It is particularly advantageous if the further method steps, such as for example arranging at least one prestressing element in a mold, tensioning the prestressing element, embedding the prestressing element in a concrete mass, and hardening of the concrete mass into a longitudinal segment, need only be performed once for the manufacture of several segments.

It is particularly preferred here that the longitudinal segment is cut by means of sawing and/or by means of water jet cutting. To saw the longitudinal segment, preferably a concrete saw with diamond saw blades is used. To cut the longitudinal segment by means of water jet cutting, preferably a water jet cutting machine is used, wherein particularly preferably an abrasive water jet with at least one abrasive agent is used.

According to a further preferred embodiment, it is provided that the method comprises arranging a reinforcement in the mold, wherein the reinforcement preferably comprises or consists of fibers, in particular polymer-coated fibers, and/or fiber-reinforced plastic and/or steel. A reinforcement may generally mean a physically arranged reinforcement. The reinforcement in principle serves for strengthening in particular the load-bearing behavior, in conjunction with concrete or another composite material of the reinforced element. The reinforcement may absorb both compression, tension and bending forces. The reinforcement may preferably comprise rods and/or fibers of materials with high tensile strength, such as for example metal, in particular steel, glass and/or carbon. Particularly preferably, the reinforcement comprises or consists of fibers and/or fiber-reinforced plastic. A concrete reinforced with fibers in this way is often also known as textile concrete. In particular, it is advantageous if the reinforcement comprises glass fibers, preferably AR glass fibers and/or E glass fibers, and/or carbon fibers. Preferably, the fibers have a polymer coating which protects the fibers. An advantage of using such reinforcement is that the fibers with a polymer coating may be chemically more resistant than a conventional prestressing element which consists for example of steel. An advantage of the use of AR glass fibers is that a prestressing element with these fibers may be chemically more resistant than a conventional prestressing element made for example from steel. The reinforcement need not therefore have a minimum distance from the edge of the segment in order to avoid corrosion.

It is furthermore preferred if the method comprises producing the prestressing element in the vacuum infusion process and/or manual laminating process and/or pultrusion process. Preferably, in the vacuum infusion process, the fibers—particularly preferably in the form of a nonwoven fabric—are laid in a mold, covered with a vacuum film and then impregnated with a pourable resin, wherein under a reduced pressure, the resin flows from a casting point or several casting points to a vacuum connection or several vacuum connections. In the vacuum infusion process, it is particularly advantageous that a relatively high fiber volume content can be achieved, in particular a higher fiber volume content than with the manual laminating process. With the pultrusion process, fiber-reinforced profiles may be produced in a continuous manufacturing process. In the pultrusion process, it is particularly advantageous that manufacturing of the prestressing elements may be continuous and at least partially automated, and hence few personnel are required for manufacturing the prestressing elements.

It is even more preferred if the method comprises roughening the surface of the prestressing element, preferably by means of sanding. This is particularly advantageous since such a roughening of the surface allows better transmission of the force between the prestressing element and the concrete part. Sanding means in particular the application of sand to the surface of the prestressing element. Preferably, the sand is applied to the surface of the prestressing element and the sand is connected to the prestressing element, for example by means of a coating and/or an adhesive. Particularly preferably, fine-grained sand with a grain size of preferably maximum 0.5 mm, particularly preferably maximum 0.35 mm, and in particular preferably 0.2 mm is used. Sanding substantially increases the surface roughness of the surface of the prestressing element and hence can improve the bonding capacity between the prestressing element and the concrete part.

It is even more preferred if the surface of the prestressing element is roughened, preferably sanded. Sanding preferably takes place by the application of an adhesive to the surface of the prestressing element and subsequent application of sand to the adhesive, so that the adhesive connects the sand to the surface of the prestressing element. Sanding may in particular also take place if a coating material with sand, preferably arranged in a coating bath, is supplied for application of a coating to the surface of the prestressing element. Here, on application of the coating to the surface of the prestressing element, preferably by means of immersing the prestressing element in the coating bath, the sand together with the coating material is applied to the surface of the prestressing element.

The coating is preferably alkali-resistant, whereby advantageously undesirable chemical reactions between the prestressing element and the concrete mass can be avoided.

Furthermore preferably, the coating is configured to improve the connection of the prestressing element to the concrete mass.

Also, the coating preferably has a temperature resistance of at least 60° C., preferably at least 80° C., particularly preferably at least 100° C.

Since the temperature resistance of the coating and/or the prestressing element usually determines the maximum usage temperature of the entire component, in contrast to conventionally used textile concrete or concrete parts with rods of glass fiber-reinforced plastic, a segment produced as described herein may be used at very much higher temperatures, for example up to 100° C. This is advantageous in particular for segments for towers of wind turbines, since these towers may have relatively high temperatures of for example up to 60° C. when exposed to very strong sunlight.

It is furthermore preferred if a reinforcement is arranged in the concrete part, wherein the reinforcement preferably comprises or consists of fibers, in particular polymer-coated fibers, and/or fiber-reinforced plastic, preferably with a fiber part, and/or steel. The fibers of the reinforcement preferably have a sizing, in particular an alkali-resistant sizing, whereby an advantageous chemical resistance is achieved. Furthermore preferably, the sizing is configured to improve the connection of the fibers and/or fiber part and/or reinforcement to the concrete mass.

Also, the sizing preferably has a temperature resistance of at least 60° C., preferably at least 80° C., particularly preferably at least 100° C.

It is furthermore preferred if the fiber-reinforced plastic of the prestressing element has a fiber part, wherein preferably the fiber part comprises and/or consists of glass fibers, in particular AR glass fibers and/or E glass fibers, and/or carbon fibers and/or polyethylene fibers and/or basalt fibers. Furthermore preferably, the fiber-reinforced plastic of the prestressing element has a fiber part, wherein the fibers of the fiber part have a sizing. Here, the sizing is preferably alkali-resistant, whereby an advantageous chemical resistance is achieved. Furthermore preferably, the sizing is configured to improve the connection of the fibers and/or fiber part and/or prestressing element to the concrete mass. Also, the sizing preferably has a temperature resistance of at least 60° C., preferably at least 80° C., particularly preferably at least 100° C.

It is even more preferred if the fiber-reinforced plastic of the prestressing element has a matrix part with a duroplastic, in particular in the form of epoxy resin or unsaturated polyester. Here, the matrix part preferably has a high temperature resistance, preferably of at least 80° C., particularly preferably at least 100° C.

In particular, it is preferred if at least one connecting device is arranged in the complete longitudinal segment or in the longitudinal segment, wherein the prestressing elements are passed through the connecting device or guided past the connecting device. The connecting device may in particular consist of steel and/or be connected by force fit to the hardened concrete mass. After cutting of the complete longitudinal segment or longitudinal segment, the connecting device preferably lies at the edge of a segment. The connecting device may serve to create a connection, in particular a bolted connection, to a segment adjacent to the segment which may also have a connecting device. In particular, it is preferred if two connecting elements are arranged next to one another in the complete segment or longitudinal segment, and the cutting takes place between the two connecting elements so the connecting elements are each arranged at the edge of the produced segments.

According to a second aspect, provided is a prestressed segment for a tower, in particular of a wind turbine, comprising: a concrete part; at least one tensioned prestressing element embedded in the concrete part, wherein the prestressing element comprises or consists of fiber-reinforced plastic. The segment is preferably produced by cutting of a longitudinal segment. By embedding the tensioned prestressing element in the concrete part, the segment is also prestressed. The prestressing element preferably has a flat or lamellar geometry. However, other forms of the prestressing element are also possible. Thus a prestressing element may also be formed rod-like and for example have a round cross-section.

According to a particularly preferred embodiment, the fiber-reinforced plastic of the prestressing element has a fiber part with glass fibers, in particular AR glass fibers and/or E glass fibers, and/or carbon fibers and/or polyethylene fibers and/or basalt fibers, and a matrix part with a duroplastic, in particular in the form of epoxy resin or unsaturated polyester. The fibers are preferably present as so-called endless fibers which could also be described as filaments.

It is furthermore preferred if the concrete part comprises or consists of fine concrete. The concrete mass from which the fine concrete is produced by hardening preferably has a fine aggregate grain size. The aggregate grain size is preferably at most 64 mm, in particular at most 32 mm, at most 25 mm, at most 20 mm, at most 60 mm, further preferably at most 8 mm, further preferably at most 6 mm, particularly preferably at most 4 mm and in particular preferably at most 2 mm. With such a limit on the aggregate grain size, even on use of a reinforcement comprising fibers and/or fiber-reinforced plastic, the pourable concrete mass can be distributed between the fibers and/or fiber-reinforced plastic. The selection of maximum aggregate grain size depends in particular on the component geometry and reinforcement density. Thus in particular the aggregate grain size may be selected finer, the smaller the component geometry, in particular the component thickness, and the denser the reinforcement density.

It is even further preferred if the prestressing element has a longitudinal direction, a transverse direction oriented orthogonally to the longitudinal direction, and a thickness direction oriented orthogonally to the longitudinal direction and orthogonally to the transverse direction, and the extent of the prestressing element in the longitudinal direction is greater, in particular many times greater, than in the transverse direction, and the extent of the prestressing element in the transverse direction is preferably greater than in the thickness direction.

According to a further aspect, provided is a tower ring for a tower, in particular of a wind turbine, comprising at least two segments, wherein the segments are each connected together by at least one connecting body for insertion in the tower ring, comprising a first side wall with at least a first opening through which a fixing element may pass, and a second side wall opposite the first side wall with at least one second opening through which a fixing element may pass, an upper transverse wall and a lower transverse wall opposite the upper transverse wall; wherein the upper and lower transverse walls are arranged substantially orthogonally to the first and second side walls and connect the latter.

The first and/or second side wall of the connecting body preferably has a substantially planar geometry which is formed by a horizontal extent and a vertical extent running orthogonally thereto. Furthermore, the side walls have a thickness oriented orthogonally to the horizontal extent and to the vertical extent, wherein said thickness preferably has a very small dimension in comparison with the dimensions of the horizontal extent and vertical extent. The side walls here preferably have a mainly flat surface. The thickness of the side walls may have a continuous dimension, wherein furthermore a thickening or tapering may be provided at regions with correspondingly higher and lower load. It is furthermore possible for the side walls to have recesses and/or ribbing.

According to a further aspect, provided is a tower of a wind turbine comprising several segments and/or several tower rings, wherein the segments are connected together, preferably releasably, particularly preferably by means of bolted connections. It is particularly preferred if all adjacent segments are connected together by means of bolted connections. Here it is advantageous that the segments may be connected by bolted connections on site with relatively little requirement for labor and time.

According to a further aspect, provided is a wind turbine comprising a tower. The tower is preferably configured as a concrete tower or hybrid tower. The tower preferably comprises several tower rings arranged horizontally one above the other. The tower has a height of preferably more than 80 m, particularly preferably more than 100 m, and in particular more than 120 m.

According to a further aspect, provided is a prestressing device for holding and tensioning at least one prestressing element, comprising: a first and a second clamping cheek, between which the prestressing element can be fixed, preferably by force fit, for receiving force applied to the prestressing element in a longitudinal direction of the prestressing element; a head part which is releasably connected to the first and second clamping cheeks, wherein the head part comprises a fixing portion, preferably in the form of passage holes, wherein the head part is movable parallel to the longitudinal direction of the prestressing element, preferably by means of a connection between the head part and a threaded rod, in order to tension the prestressing element by application of a stretch to the prestressing element. Preferably, by means of surface pressure, a force-fit connection is created between the clamping cheeks and the prestressing element. The clamping cheeks are preferably connected together by means of at least one bolted connection. The head part is preferably connected to the clamping cheeks by means of at least one bolted connection. The clamping cheeks preferably have a platform-like geometry. It is preferred if the first and second clamping cheek have the same shape.

It is even more preferred if a segment comprises two prestressing devices arranged at opposite ends of the segment. Preferably, the prestressing devices arranged at the ends of the segment remain on the segment and are installed with this in the tower. Here, the prestressing devices are preferably used as connecting elements for connecting adjacent segments. In particular, adjacent segments may be connected together by means of bolted connections via the fixing portions.

The further aspects described above and their possible refinements have features or method steps which make them particularly suitable for being manufactured using a method described herein and its refinements.

For the advantages, embodiment variants and design details of the various aspects of the solutions described herein and their possible refinements, reference is made to the description of the corresponding features, details and advantages of the other aspects and their refinements.

BRIEF DESCRIPTION OF THE SEVERAL VIEWS OF THE DRAWINGS

Preferred exemplary embodiments are now described as an example with reference to the attached figures. The drawings show.

In the figures, the same elements or those with substantially the same or similar function carry the same reference signs.

DETAILED DESCRIPTION

Figure 1:
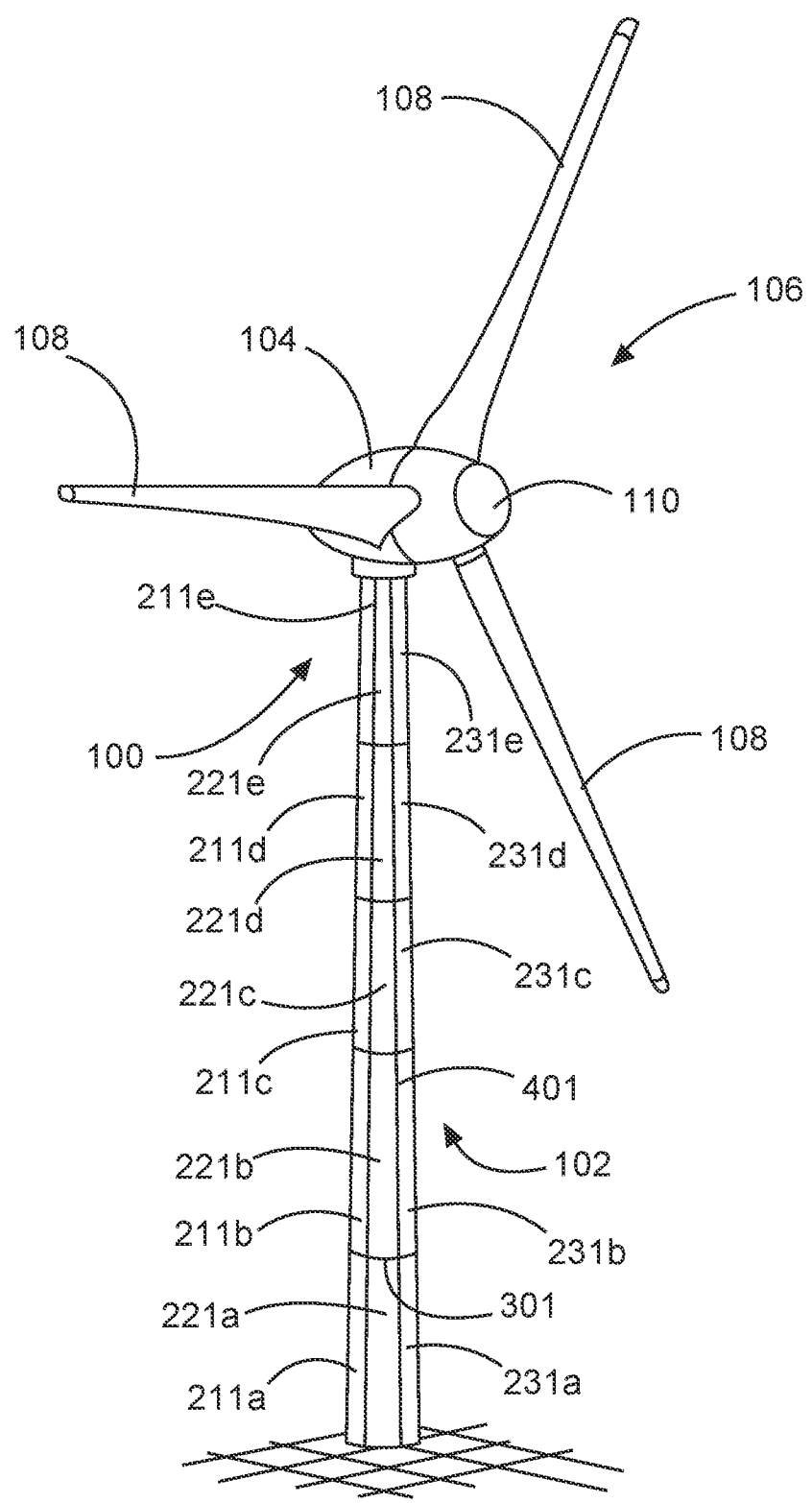
FIG. 1 shows a diagrammatic depiction of a wind turbine with a tower.

FIG. 1 shows a wind turbine 100 with a tower 102 and a nacelle 104. A rotor 106 with three rotor blades 108 and a spinner 110 is arranged on the nacelle 104. The rotor 106 is set in a rotary motion by the wind in operation and thereby drives a generator in the nacelle 104. The tower comprises several segments 211a, 221b, 221c, 221d, and 211e; 221a, 221b, 221c, 221d, and 221e; and 231a, 231b, 231c, 231d, and 231e. In each case, several segments 211a, 221a, 231a (and segments on the rear side which are not shown) form a tower ring, wherein the segments which form a tower ring are each connected together via vertical joints 401. The adjacent segments are bolted together along the vertical joints. In the example shown here, the tower 102 has five tower rings arranged one above the other, wherein the tower rings are each connected together via horizontal joints 301. The tower rings are bolted together along the horizontal joints. The number of tower rings varies in particular depending on the tower height and on the tower dimensions as a whole.

Segments arranged horizontally one above the other may be produced from one complete longitudinal segment. Thus for example the segments 211a, 211b, 211c, 211d, 211e may be produced by cutting through one complete longitudinal segment. Also, for example the segments 221a, 221b, 221c, 221d, 221e were produced from one complete longitudinal segment. Also for example the segments 231a, 231b, 231c, 231d, 231e were produced one complete longitudinal segment. In this exemplary embodiment, two segments arranged horizontally one above the other were produced from one longitudinal segment. Thus, for example, segments 211a and 211b were produced from one longitudinal segment. Also, for example, segments 221a and 221b were produced from one longitudinal segment.

In FIGS. 2a, 2b, 3a, 3b, 4 and 5, prestressing elements, prestressing devices and bolt boxes are shown but without any concrete mass or concrete part. The prestressing elements and any bolt boxes shown in FIGS. 2a, 2b, 3a, 3b, 4 and 5 are in particular arranged in a mold (not shown) in order to then be embedded in the concrete mass, which then hardens into the concrete part. FIGS. 6a and 6b also show this concrete mass or concrete part.

Figure 2A:
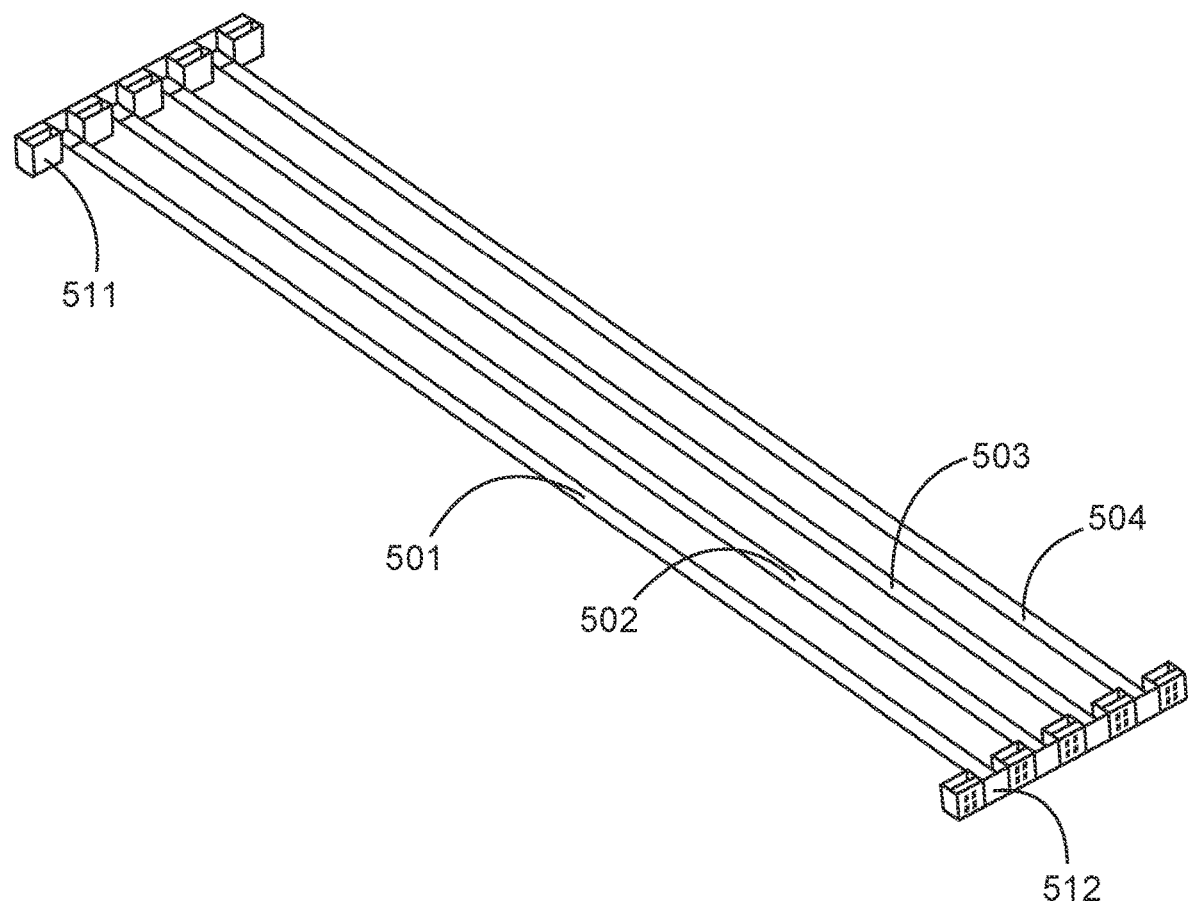
FIG. 2a shows a perspective view of prestressing elements between two prestressing devices.

FIG. 2a shows four prestressing elements 501, 502, 503, 504 which are each connected to a first prestressing device 511 and a second prestressing device 512. The prestressing elements 501, 502, 503, 504 have a flat, strip-like geometry. The prestressing elements 501, 502, 503, 504 are arranged parallel to one another. The prestressing elements 501, 502, 503, 504 consist of fiber-reinforced plastic. The prestressing elements are preferably produced by means of step 1001 of the described method. Furthermore, the surface of the prestressing elements may be roughened, for example according to step 1002 of the method. The first prestressing device 511 and the second prestressing device 512 may move apart relative to one another, whereby a tensile stress may be exerted on the prestressing elements 501, 502, 503, 504 according to step 1005 of the method.

Figure 2B:
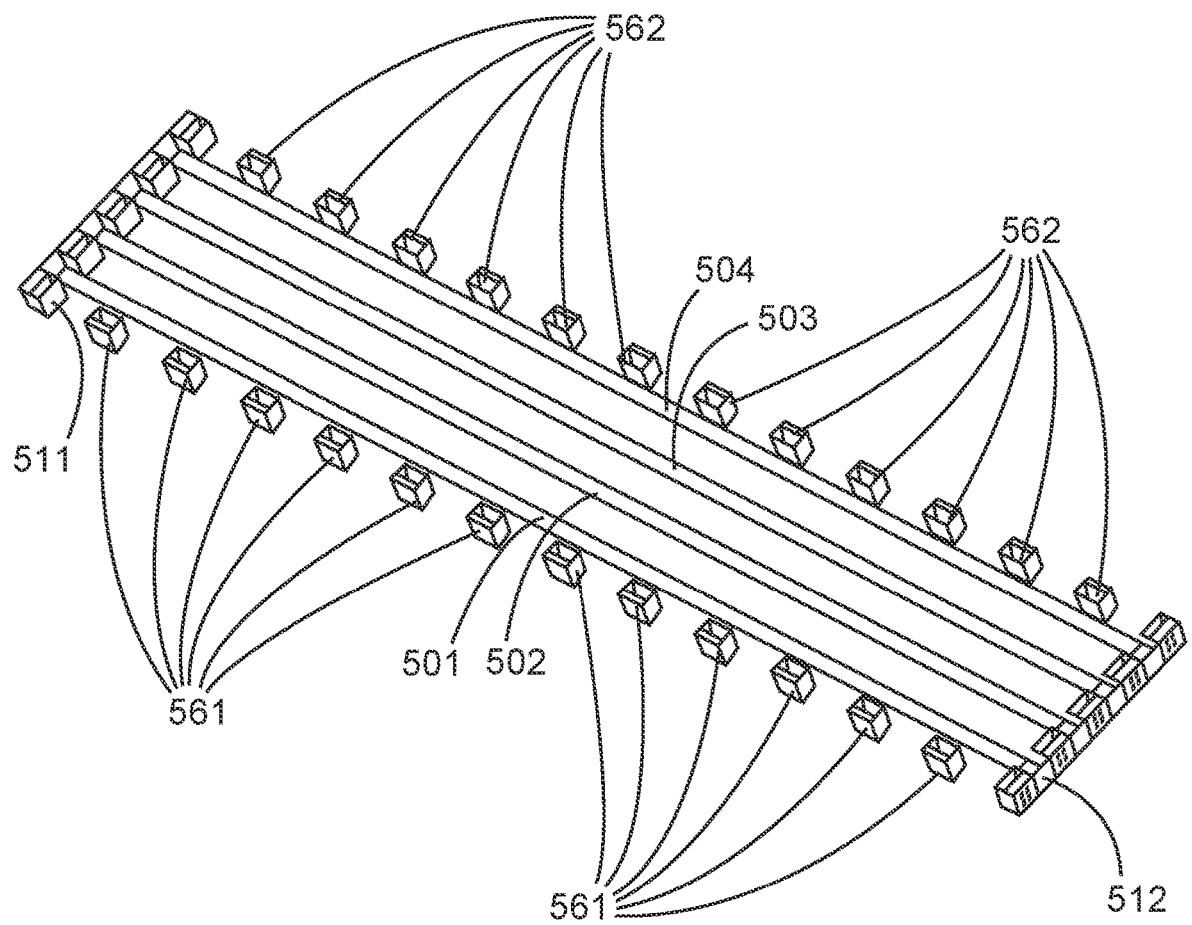
FIG. 2b shows a perspective view of prestressing elements between two prestressing devices and several bolt boxes.

FIG. 2b also shows four prestressing elements 501, 502, 503, 504 which are each connected to a first prestressing device 511 and a second prestressing device 512. The prestressing elements 501, 502, 503, 504 have a flat, strip-like geometry. The prestressing elements 501, 502, 503, 504 are arranged parallel to one another. The prestressing elements 501, 502, 503, 504 consist of a fiber-reinforced plastic. The prestressing elements are preferably produced by means of step 1001 of the described method. Furthermore, the surface of the prestressing elements may be roughened, for example in step 1002 of the method. The first prestressing device 511 and the second prestressing device 512 may be moved apart relative to one another, whereby a tensile stress may be applied to the prestressing elements 501, 502, 503, 504 according to step 1005 of the method. Furthermore, FIG. 2b shows bolt boxes 561, 562 arranged adjacent to the prestressing elements. The bolt boxes are arranged next to each other, parallel to the prestressing elements. The bolt boxes 561 run next to the prestressing element 501, and the bolt boxes 562 run next to the prestressing element 504.

Figure 3A:
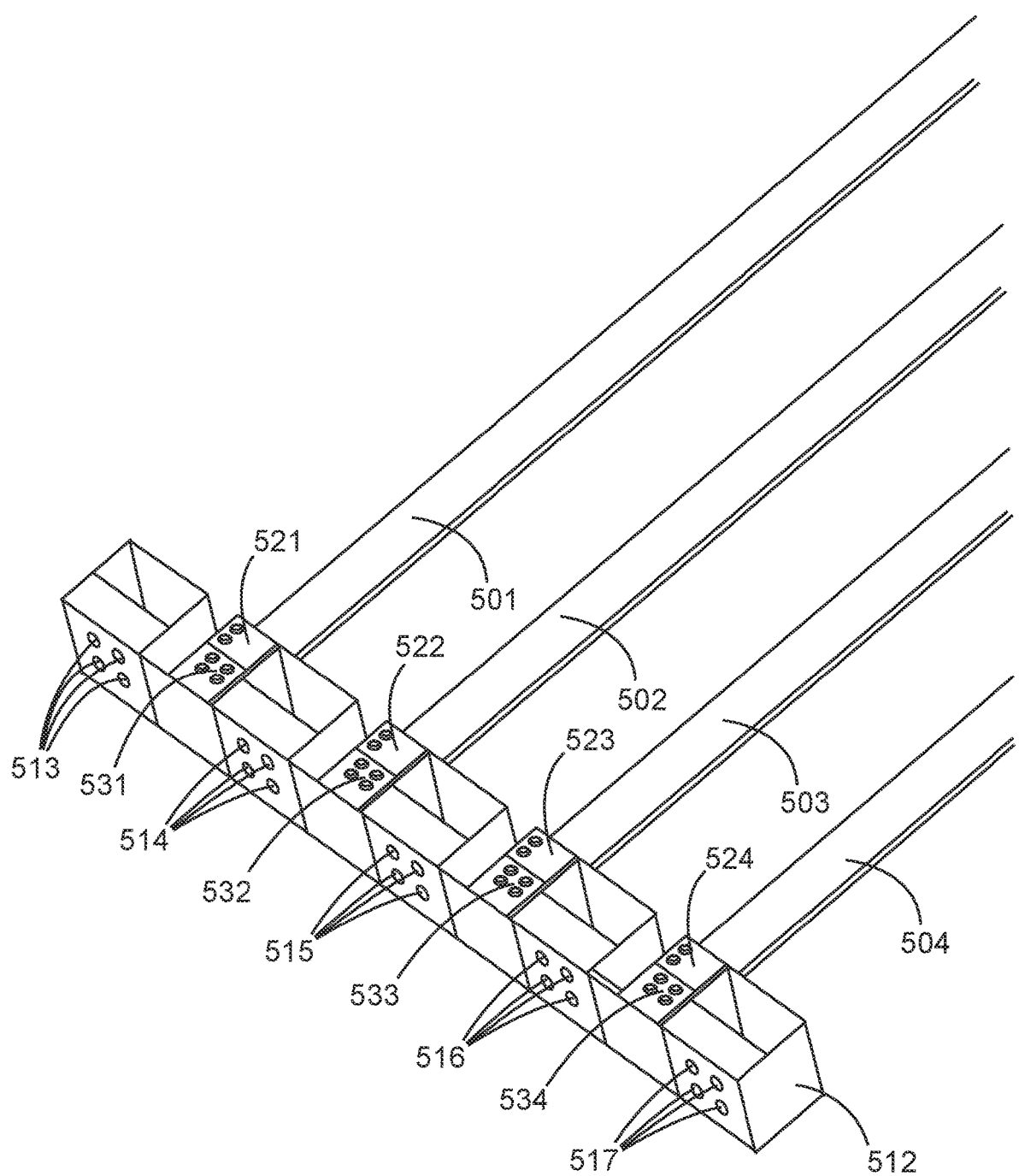
FIG. 3a shows a perspective view of a prestressing device with prestressing elements connected thereto.

FIG. 3a shows the second prestressing device 512 and the four prestressing elements 501, 502, 503, 504 which are each connected to the second prestressing device 512. The prestressing elements 501, 502, 503, 504 are here each attached to the second prestressing device by clamping cheeks 521, 522, 523, 524. The clamping cheeks 521, 522, 523, 524 are each connected to the head part of the prestressing device 512 by means of connecting plates 531, 532, 533, 534. The head part of the prestressing device 512 has several fixing portions with passage holes 513, 514, 515, 516, 517. Via these passage holes, the prestressing device for applying a tensile stress to the prestressing elements may either be fixed in one position, for example by means of a bolted connection, or be connected movably such that the prestressing device can be moved for application of a tensile stress. The prestressing elements are arranged in a mold according to step 1003 of the method.

Figure 3B:
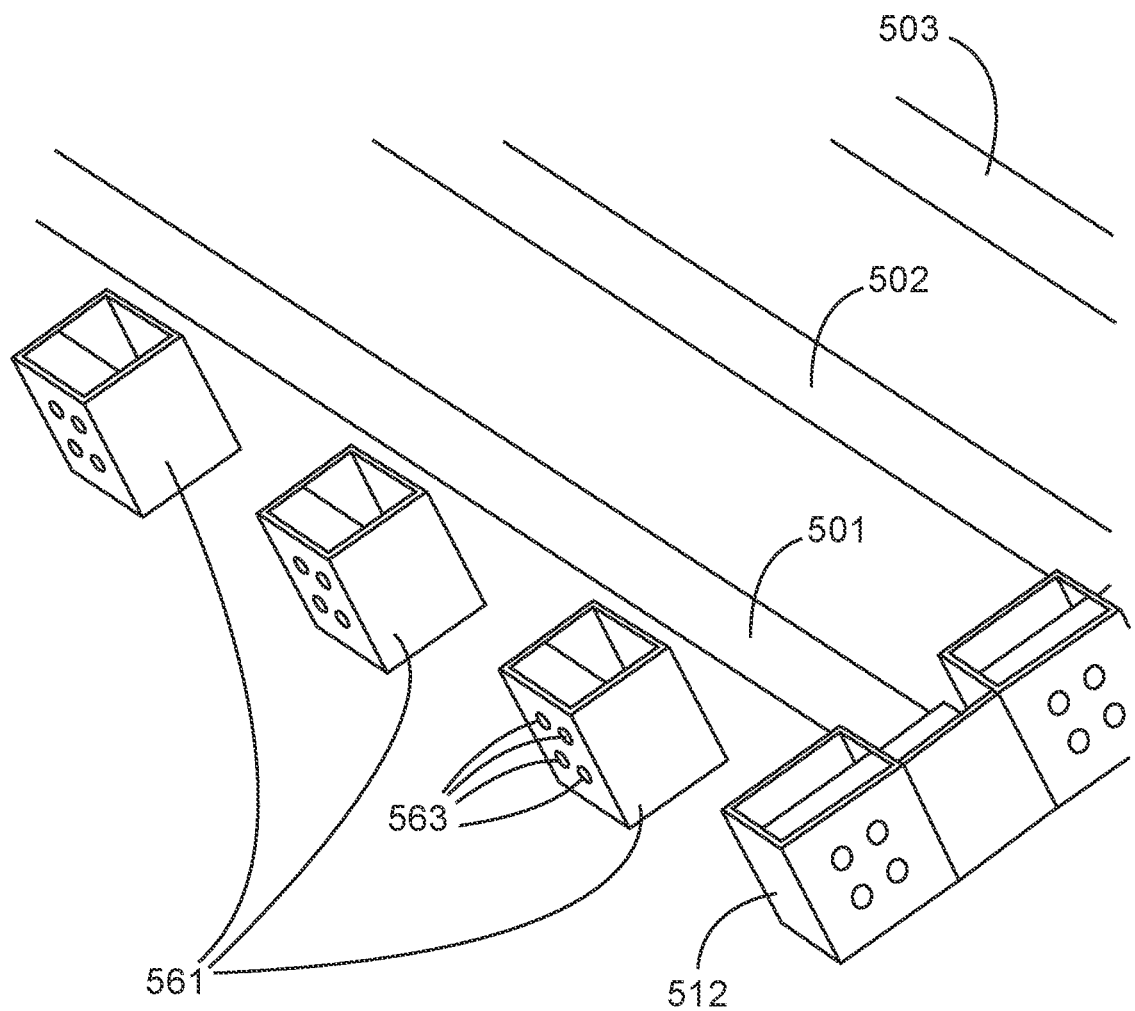
FIG. 3b shows a perspective view of a portion of a prestressing device with prestressing elements connected thereto, and bolt boxes arranged next to the prestressing elements.

FIG. 3b shows the second prestressing device 512 and three prestressing elements 501, 502, 503 which are each connected to the second prestressing device 512. In the example shown here, several bolt boxes 561 are arranged next to the prestressing element 501. The bolt boxes each have passage holes 563. In the installation state or operating state of the tower, these passage holes serve for connecting together, by means of bolted connections, two adjacent segments, longitudinal segments or complete segments along the vertical joint 401. The segments, longitudinal segments or complete segments may be connected to the adjacent bolt boxes. A tower ring may be produced by such a connection of adjacent segments.

Figure 4:
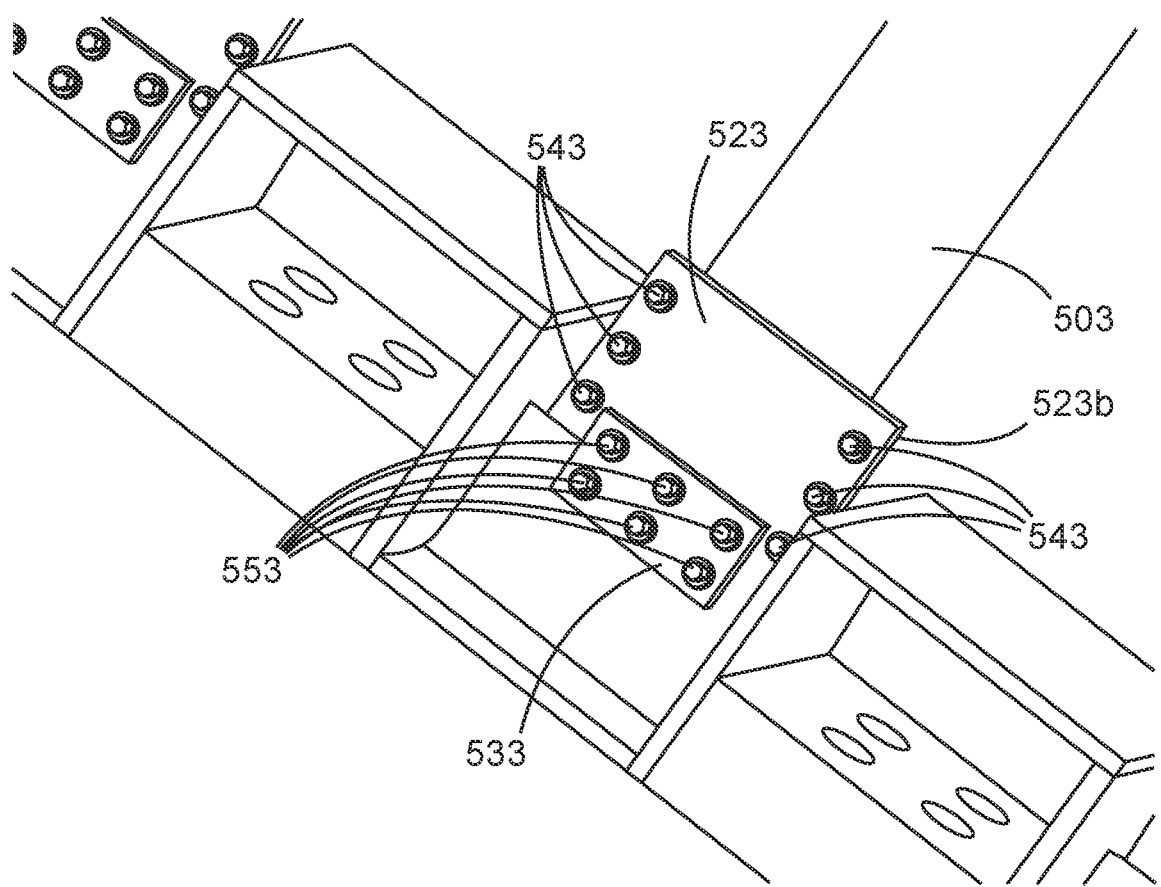
FIG. 4 shows a perspective detail view of the connection between a prestressing element and a prestressing device.
Figure 5:
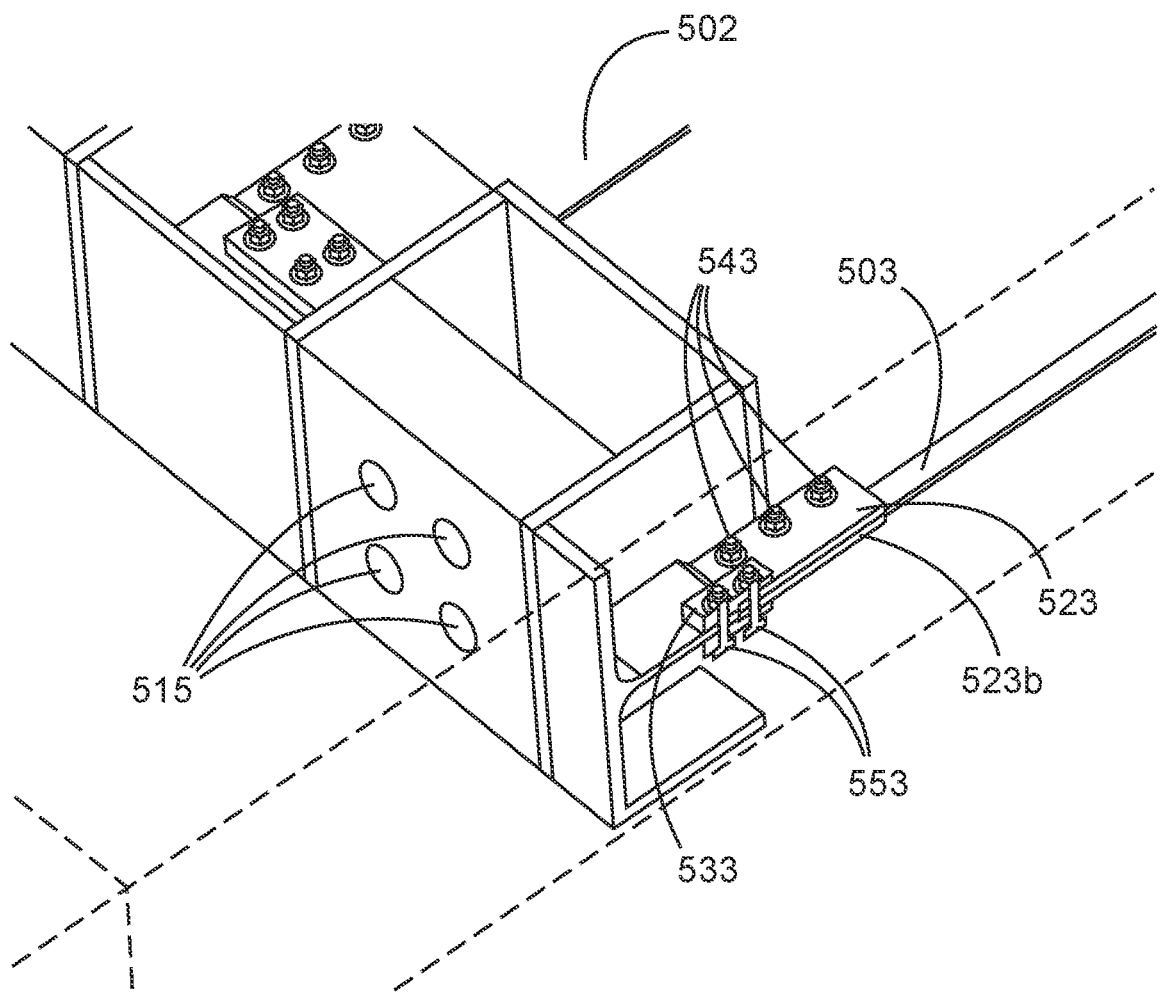
FIG. 5 shows a perspective sectional view of the connection between a prestressing element and a prestressing device.
Figure 6A:
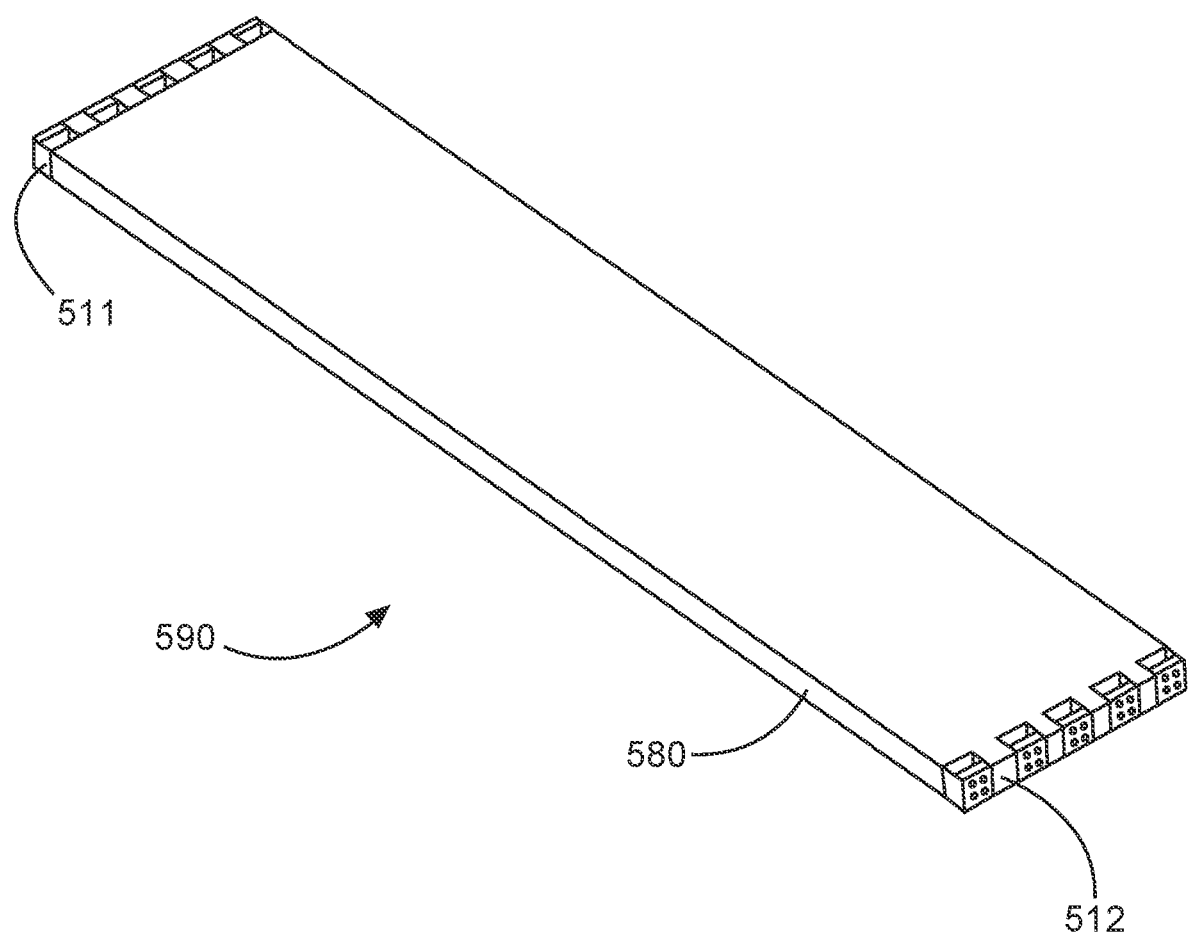
FIG. 6a shows a perspective view of a complete longitudinal segment.
Figure 6B:
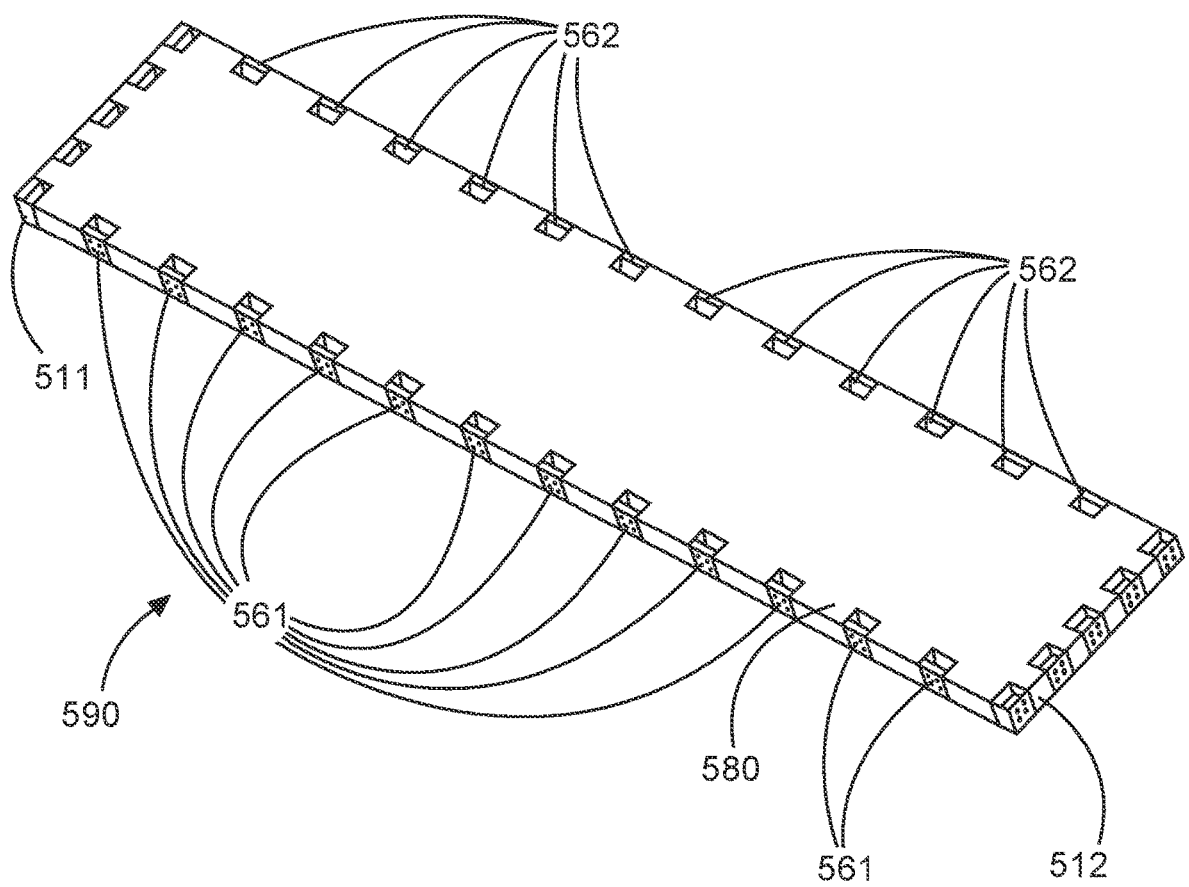
FIG. 6b shows a perspective view of a complete longitudinal segment with several bolt boxes.

FIG. 4 and FIG. 5 show a prestressing element 503 which is clamped between a first clamping cheek 523 and a second clamping cheek 523b. The clamping force between the first clamping cheek 523 and the second clamping cheek 523b is applied by means of six bolted connections 543. The connecting plate 533 connects the clamping cheeks 523, 523b to the head part of the prestressing device via six bolted connections 553.

FIG. 6a shows a complete longitudinal segment 590 with a forming concrete part 580 and two prestressing devices 511, 512. The tensioned prestressing elements are situated inside the concrete part. Also, a reinforcement in the form of textile reinforcement with glass fibers is arranged in the concrete part, according to step 1004 of the method. After tensioning of the prestressing elements by moving the two prestressing devices 511, 512 apart, and after arranging the prestressing elements and textile reinforcement in a mold, a pourable concrete mass is added to the mold which surrounds the tensioned prestressing elements and textile reinforcement, according to step 1006 of the method. Then the concrete mass is hardened into a hardened concrete part 580, according to step 1007 of the method. The complete longitudinal segment may then be removed from the mold according to step 1008 of the method. Then the complete longitudinal segment 590 may be cut through several times so as to produce several segments from the complete longitudinal segment, according to step 1009 of the method.

The component shown in FIG. 6 may be a similarly structured longitudinal segment or segment. If the complete longitudinal segment or longitudinal segment is not cut through, or if a segment is constructed as described herein, then the prestressing devices present on the complete longitudinal segment or longitudinal segment or segment may be used to create a connection, in particular a bolted connection, via the fixing portions of the prestressing devices, to an adjacent segment or longitudinal segment or to a foundation or steel portion. The prestressing device integrated in the complete longitudinal segment or longitudinal segment or segment may be used as a connecting part, in particular for a bolted connection. The prestressing device is used in the same way as lost formwork.

FIG. 6b shows a second exemplary embodiment of the complete longitudinal segment 590 with a forming concrete part 580 and two prestressing devices 511, 512. The complete longitudinal segment 590 shown corresponds to the complete longitudinal segment shown in FIG. 6a, with the difference that in the complete longitudinal segment shown here, several bolt boxes 561, 562 are arranged on the two outer edges. After being embedded in a concrete mass which is then hardened, these bolt boxes 561, 562 are fixedly connected to the concrete part 580. The bolt boxes are preferably arranged on a complete longitudinal segment, longitudinal segment or segment so that the bolt boxes 561 of a first complete longitudinal segment, longitudinal segment or segment lie adjacent to the bolt boxes 562 of a second complete longitudinal segment, longitudinal segment or segment which is adjacent thereto in the installation state or operating state of the tower, so that a respective connection can be created between the bolt boxes 561 and 562 of the adjacent complete longitudinal segments, longitudinal segments or segments.

Figure 7:
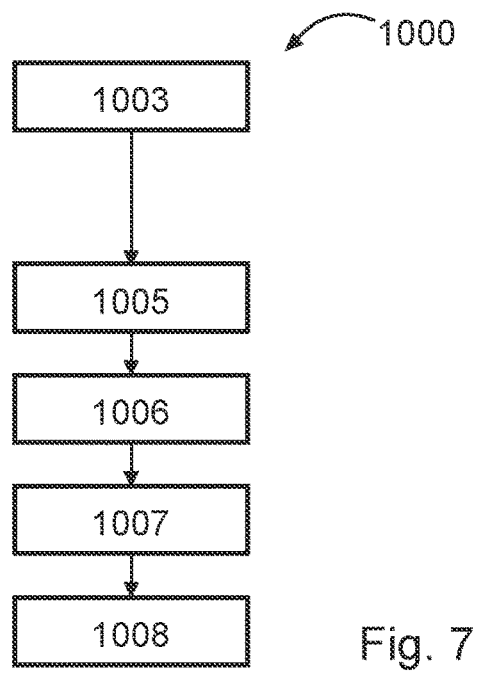
FIG. 7 shows a diagrammatic depiction of a first exemplary embodiment of the method for manufacturing segments for a tower, in particular of a wind turbine.

FIG. 7 shows a diagrammatic depiction of a first exemplary embodiment of the method 1000 for manufacturing segments for a tower, in particular of a wind turbine. In step 1003, at least one prestressing element is arranged in a mold, wherein the prestressing element comprises or consists of fiber-reinforced plastic. Firstly, the prestressing element is placed in a mold and arranged such that the position of the prestressing elements in the mold corresponds to the position of the prestressing elements in the segment. In step 1005, the prestressing element is tensioned. For this, the prestressing element is connected to a prestressing device at each end. Then the prestressing devices are moved apart. In this way, a stretch and hence a tensile stress is applied to the prestressing element. In step 1006, the prestressing element is embedded in a concrete mass. In this step, a pourable concrete mass is cast into the mold so that the concrete mass surrounds the prestressing element. In step 1007, the concrete mass hardens into a longitudinal segment, preferably in the form of a complete longitudinal segment of a tower. The initially still pourable concrete mass is now hardened so that a force-fit connection is created between the prestressing element and the hardened concrete mass. In step 1008, the hardened longitudinal segment is removed from the mold. The longitudinal segment with the hardened concrete part is thus extracted from the mold.

Figure 8:
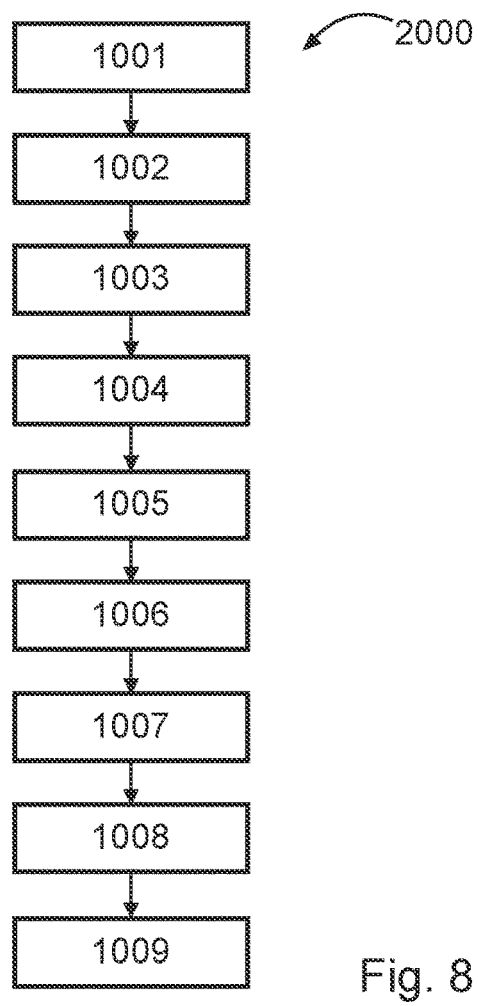
FIG. 8 shows a diagrammatic depiction of a second exemplary embodiment of the method for manufacturing segments for a tower, in particular of a wind turbine.

FIG. 8 shows a diagrammatic depiction of a second exemplary embodiment of the method 2000 for manufacturing segments for a tower, in particular of a wind turbine. The method 2000 corresponds in steps 1003, 1005, 1006, 1007 and 1008 to the first exemplary embodiment of the method 1000 for manufacturing segments for a tower, in particular of a wind turbine. The method 2000 comprises further steps. In step 1001, the prestressing element is produced in the vacuum infusion method and/or manual laminating method and/or pultrusion method. A prestressing element produced in this way consists of fiber-reinforced plastic. In step 1002, the surface of the prestressing element is roughened, preferably by sanding. Preferably, the sand is applied to the surface of the prestressing element, for example together with a coating which binds the sand to the surface. This increases the surface roughness of the prestressing element, whereby a better force transmission is possible between the prestressing element and the hardened concrete mass. Steps 1001 and/or 1002 may take place temporally and also physically significantly spaced from the other steps.

In step 1004, a reinforcement is arranged in the mold, wherein the reinforcement preferably comprises or consists of fibers, in particular polymer-coated fibers and/or fiber-reinforced plastic and/or steel. With such a reinforcement, a textile concrete can be produced, whereby a lighter weight of the segments is possible. In step 1009, the longitudinal segment is cut into several segments. The longitudinal segment is cut through by means of sawing and/or by means of water jet cutting, in particular to produce individual segments. The individual segments thus produced furthermore each comprise at least one tensioned prestressing element embedded in the concrete part, and are therefore prestressed segments.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

LIST OF REFERENCE SIGNS

100 Wind turbine
102 Tower
104 Nacelle
106 Rotor
108 Rotor blades
110 Spinner
211a, 211b, 211c, 211d, 211e Segment
221a, 221b, 221c, 221d, 221e Segment
231a, 231b, 231c, 231d, 231e Segment
301 Horizontal joint
401 Vertical joint
501, 502, 503, 504 Prestressing element
511 First prestressing device
512 Second prestressing device
513, 514, 515, 516, 517 Passage holes
521, 522, 523, 523b, 524 Clamping cheek
531, 532, 533, 534 Connecting plate
543, 553 Bolted connections
561, 562 Bolt boxes
563 Passage holes of bolt boxes
580 Concrete part
590 Complete longitudinal segment
1000 First exemplary embodiment of the method
1001 Manufacture of prestressing element
1002 Roughening of surface of prestressing element
1003 Arrangement of at least one prestressing element in a mold
1004 Arrangement of a reinforcement in the mold
1005 Tensioning of the prestressing element
1006 Embedding of the prestressing element in a concrete mass
1007 Hardening of the concrete mass into a longitudinal segment
1008 Removing the hardened longitudinal segment from the mold
1009 Cutting the longitudinal segment into several segments
2000 Second exemplary embodiment of the method

The invention claimed is:

1. A method for manufacturing segments for a tower of a wind turbine, the method comprising:
arranging a prestressing element in a mold, wherein the prestressing element comprises fiber-reinforced plastic;
tensioning the prestressing element;

embedding the prestressing element in a concrete mass;
hardening the concrete mass into a longitudinal segment to form a longitudinal segment of a tower;
removing the longitudinal segment from the mold; and
cutting the longitudinal segment into a plurality of segments,
wherein connecting devices are located at one or more edges of the plurality of longitudinal segments between the prestressing element and the hardened concrete mass, wherein the connecting devices comprise steel, and wherein the prestressing element is passed through the connecting devices or guided past the connecting device.

2. The method as claimed in claim 1, comprising:
releasing a connection between the prestressing element and a prestressing device.

3. The method as claimed in claim 1, wherein the cutting comprises cutting the longitudinal segment by sawing or water jet.

4. The method as claimed in claim 1, comprising:
arranging a reinforcement in the mold, wherein the reinforcement comprises one or more of: fibers, polymer-coated fibers, fiber-reinforced plastic, or steel.

5. The method as claimed in claim 1, comprising:
producing the prestressing element in a vacuum infusion process, a manual laminating process, or a pultrusion process.

6. The method as claimed in claim 1, comprising:
roughening a surface of the prestressing element.

7. The method as claimed in claim 1, wherein:
the fiber-reinforced plastic of the prestressing element has a fiber part, wherein the fiber part comprises glass fibers, AR glass fibers, E glass fibers, carbon fibers, polyethylene fibers, basalt fibers, or a combination of these fibers,
the fiber-reinforced plastic of the prestressing element has a fiber part, wherein the fibers of the fiber part have a sizing, and
the fiber-reinforced plastic of the prestressing element has a matrix part with a duroplastic, wherein the duroplastic comprises epoxy resin or unsaturated polyester.

8. A segment for a tower of a wind turbine, comprising:
a concrete mass; and
at least one tensioned prestressing element embedded in the concrete mass,
wherein the at least one tensioned prestressing element comprises or consists of fiber-reinforced plastic,
a connecting device at an edge of the segment between the at least one tensioned prestressing element and the concrete mass, wherein the at least one tensioned connecting device comprises steel, and wherein the at least one tensioned prestressing element is passed through the connecting device or guided past the connecting device.

9. The segment as claimed in claim 8, wherein the fiber-reinforced plastic of the prestressing element has:
a fiber part with glass fibers, carbon fibers, polyethylene fibers, basalt fibers, or a combination of these fibers; and
a matrix part with a duroplastic, wherein the duroplastic is epoxy resin or unsaturated polyester.

10. The segment as claimed in claim 8, wherein the concrete mass comprises or consists of fine concrete.

11. The segment as claimed in claim 8, wherein the prestressing element has:
a longitudinal direction;
a transverse direction oriented orthogonally to the longitudinal direction; and
a thickness direction oriented orthogonally to the longitudinal direction and orthogonally to the transverse direction,
wherein a length of the prestressing element in the longitudinal direction is greater than a width in the transverse direction, and the width of the prestressing element in the transverse direction is greater than in the thickness direction.

12. A tower ring for a tower of a wind turbine, comprising:
a plurality of segments as claimed in claim 8, wherein the plurality of segments are each connected to adjacent segments of the plurality of segments by the connecting devices, the tower ring comprising a first side wall with at least a first opening configured to receive a fixing element, and a second side wall opposite the first side wall with at least one second opening configured to receive a fixing element, an upper transverse wall and a lower transverse wall opposite the upper transverse wall,
wherein the upper and lower transverse walls are arranged substantially orthogonally to the first and second side walls and connect the upper and lower transverse walls.

13. A tower of a wind turbine, comprising:
a plurality of tower rings as claimed in claim 12,
wherein adjacent segments of the plurality of segments are releasably connected together.

14. A wind turbine, comprising:
the tower as claimed in claim 13.

* * * * *